Oct. 25, 1949.    G. A. GENTRY    2,485,729
ROTARY GRASS CUTTER

Filed Jan. 3, 1946    3 Sheets-Sheet 1

Inventor
George A. Gentry

By Clarence A. O'Brien
and Harvey B. Jacobson
Attorneys

Oct. 25, 1949.  G. A. GENTRY  2,485,729
ROTARY GRASS CUTTER
Filed Jan. 3, 1946  3 Sheets-Sheet 2
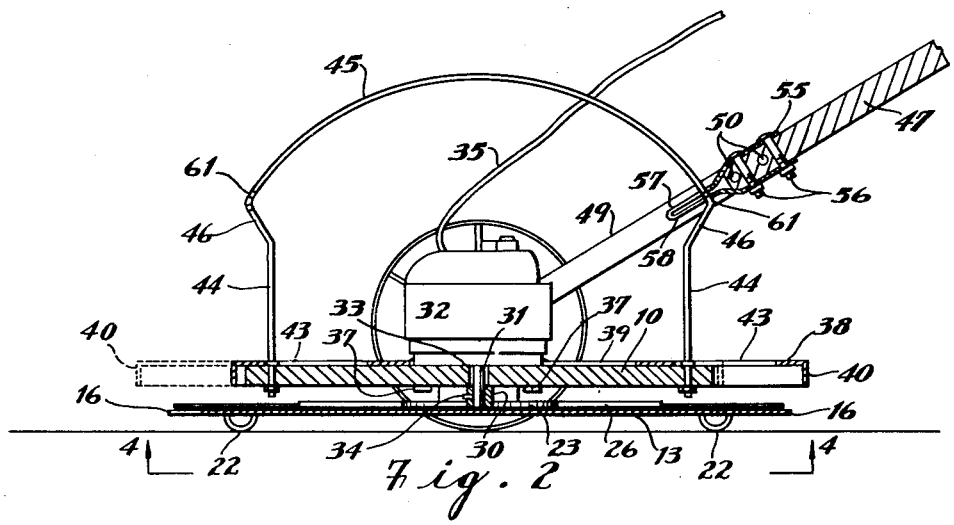
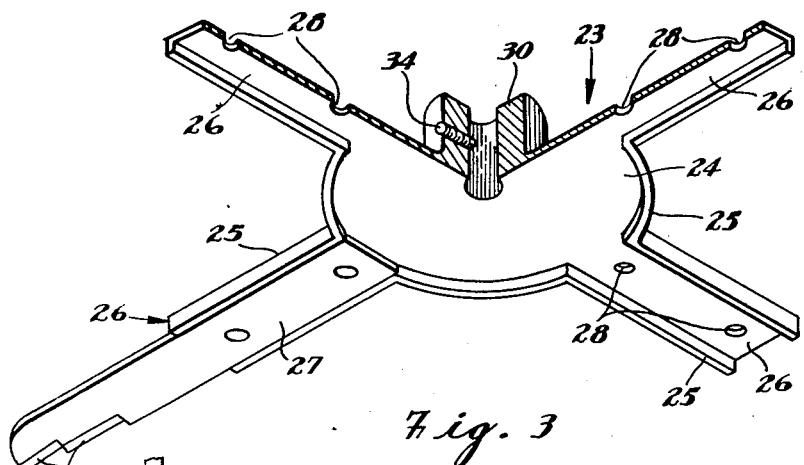
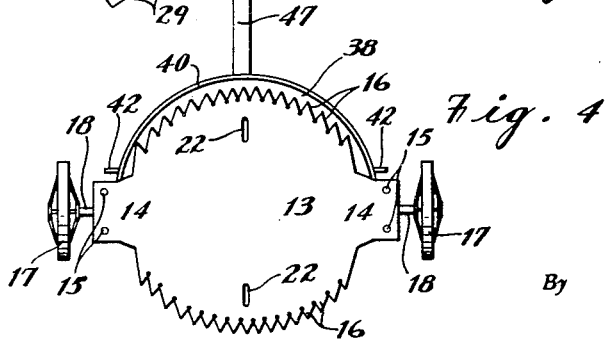
Inventor
George A Gentry
By Clarence A. O'Brien
and Harvey B. Jacobson
Attorneys Oct. 25, 1949.  G. A. GENTRY  2,485,729
ROTARY GRASS CUTTER
Filed Jan. 3, 1946  3 Sheets-Sheet 3
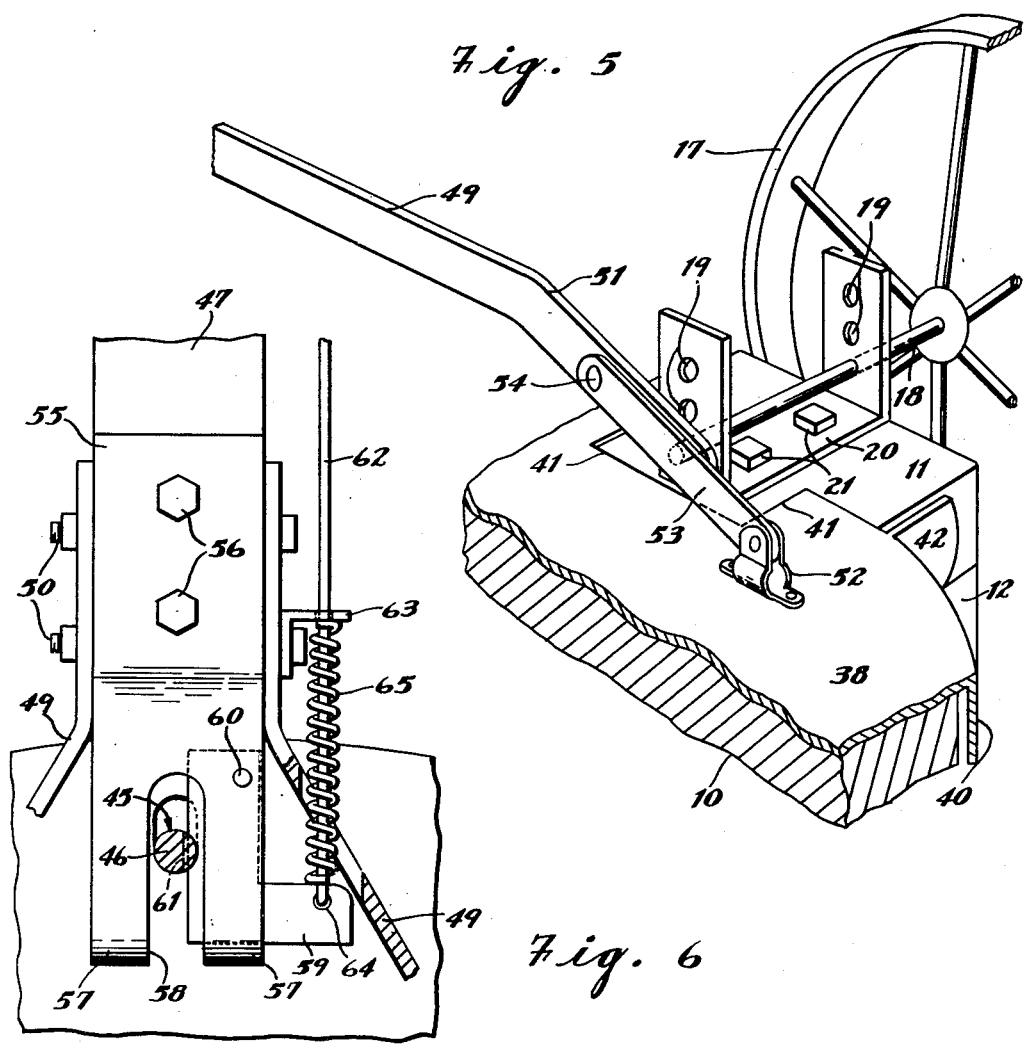
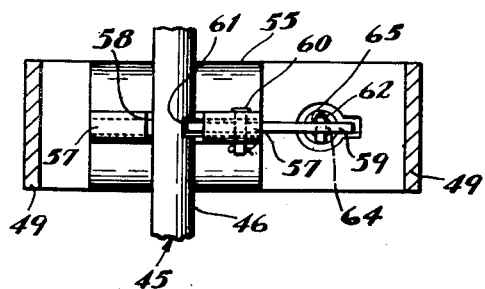
Inventor
George A. Gentry Patented Oct. 25, 1949

2,485,729

UNITED STATES PATENT OFFICE 2,485,729

ROTARY GRASS CUTTER

George A. Gentry, Newport News, Va.

Application January 3, 1946, Serial No. 638,843

3 Claims. (Cl. 56—25.4)

My invention relates to a grass cutter and more particularly an electric rotary grass cutter for the purpose of cutting lawns smoothly with little physical effort on the part of the operator and employing rotary cutting blades which efficiently cut the grass by impact therewith at high speed.

Existing conventional lawn mowers, which depend on the effort of the operator to supply the energy needed to turn the cutter blades through the action of geared wheels, are necessarily limited in their ability to cut high grass because of the small radius of the blades and are limited in their ability to approach closely to fences, trees, hedges, etc. by the radial extension of the driving wheels from the cutting blades. Moreover, the shearing action of the conventional type lawn mowers, both rotary and oscillating, precludes the fact that both of the blades must be sharp and in true alignment in order to function properly. Sticks and stones encountered by these types of lawn mowers and blades very easily render the machine inoperative by interfering with the rotation or oscillation of the blades which are so driven and very easily disturb the alignment of the blades to make it necessary for further adjustment frequently.

It is, therefore, an important object of the present invention to provide a rotary grass cutter, employing rotary blades driven at high speed by which lawns may be mowed close or right up to the surrounding fences, if any, and right up to the wall of the house, or close to the trees, bushes or hedges. The cutter blades are driven by a motor, thereby relieving the operator of the exertion of energy for driving the blades as in conventional lawn mowers, including the gears necessary to drive the same, thereby requiring that the operator merely advance the machine over a lawn.

Another object of the invention is to provide a rotary grass cutter which may be moved in opposite directions and cut the grass in either direction, without requiring that the machine be turned around as with conventional lawn mowers, thereby facilitating the mowing of the average lawn and the following of a straight path in either direction which facilitates the mowing operation and insures evenness in the cutting of the grass throughout the lawn area.

The invention also proposes and provides facility for driving the rotary cutter blades by means of a motor, especially an electric motor, which can be connected by an extension cord with the house wiring and which owing to the reversible character of the device, may be maintained on one side thereof to keep the same from the cutter and thus prevent fouling of the extension cord. By permitting the handle of the cutter to swing into position to reverse the cutter to operate in both directions, backward and forward, when one end of a lawn is reached, the handle is merely turned over and the device operated in the opposite direction, taking a new swath of the grass of the lawn.

The invention also provides means for adjusting the cutter vertically to several heights, so that the grass may be cut as close to the ground as desired or at varying heights.

The invention also embodies a mower or cutter having a toothed guard, the teeth of which extend beyond the extremities of the rotary cutter blades, the teeth preventing large sticks or stones coming in contact with the blades to interfere with the rotation and cutting action thereof by impact with the grass.

Another object of the invention is to provide a grass cutter employing the principle of the action of the scythe, namely, that of sudden impact of a sharp blade with the grass or other vegetation to be cut, and to provide means to prevent the operator's feet from coming in contact with the revolving blades and causing injury, said means embody a movable guard which operates over the rotary cutter blades so as to cover the blades and shield the operator's feet from touching the toothed guard positioned under the blades but out of contact therewith so as to eliminate the necessity for a shearing action, the guard extending rearwardly in the direction which the handle extends and is grasped by the operator in advancing the machine, and adapted to be shifted to the opposite side, upon the position of the handle being reversed, so as to always protect the operator at the back, when the direction in which the machine is advanced is reversed, or in either direction.

Another object of the invention is to drive the cutters directly from the rotor and shaft of the motor, so as to eliminate the necessity for gears and the friction and energy required to advance a mower employing gears as a driving medium for the cutting blades.

Another object of the invention is to provide means for preventing the machine from being tilted excessively in such a manner as would cause the guard teeth and the cutting blades entering the ground or cutting too low and interfering with the advancement of the machine.

Another object of the invention is to provide a rotary grass cutter having a wheeled frame so that it may be operated in either direction by swinging the handle to one end or the other, that is, at the front or back so that the cutter will operate either forward or backward, while a guard is provided over the base board, guard teeth and cutter blades and so supported as to slide back and forth with the operation of the handle to protect the feet of the operator in moving in either direction, the guard being connected to the handle yoke through connecting links, thus always causing it to be in proper relation to the direction of the operator while the handle is retained in position when swung in either direction, until released.

It is also an object of the invention to provide a mowing machine or rotary grass cutter which is simple, efficient in mowing lawns at very little expense and physical effort on the part of the operator, and which can be economically manufactured and sold.

Other objects and advantages reside in the details of construction and operation as more fully hereinafter described and claimed, reference being had to the accompanying drawings forming part hereof, wherein like numerals refer to like parts throughout, and in which:

Figure 2 is a vertical sectional view thereof with a portion of the handle omitted.

Figure 3 is an underside perspective view partly in section, showing the rotary cutter and the manner of mounting the blades thereof.

Figure 4 is a bottom view on a reduced scale showing the toothed guard plate beneath the rotary cutter and the guard for protecting the feet of the operator.

Figure 5 is an enlarged fragmentary perspective view partly in section, showing the manner of mounting the ground wheels of the device and the operative connection thereof with the yoke of the handle as well as the connection of the yoke with the movable guard which is shifted to protect the feet of the operator in moving in either direction.

Figure 6 is an enlarged fragmentary plan view showing the latch for holding the handle in either direction, and Figure 7 is a front elevation of the structure shown in Figure 6.

Figure 1:
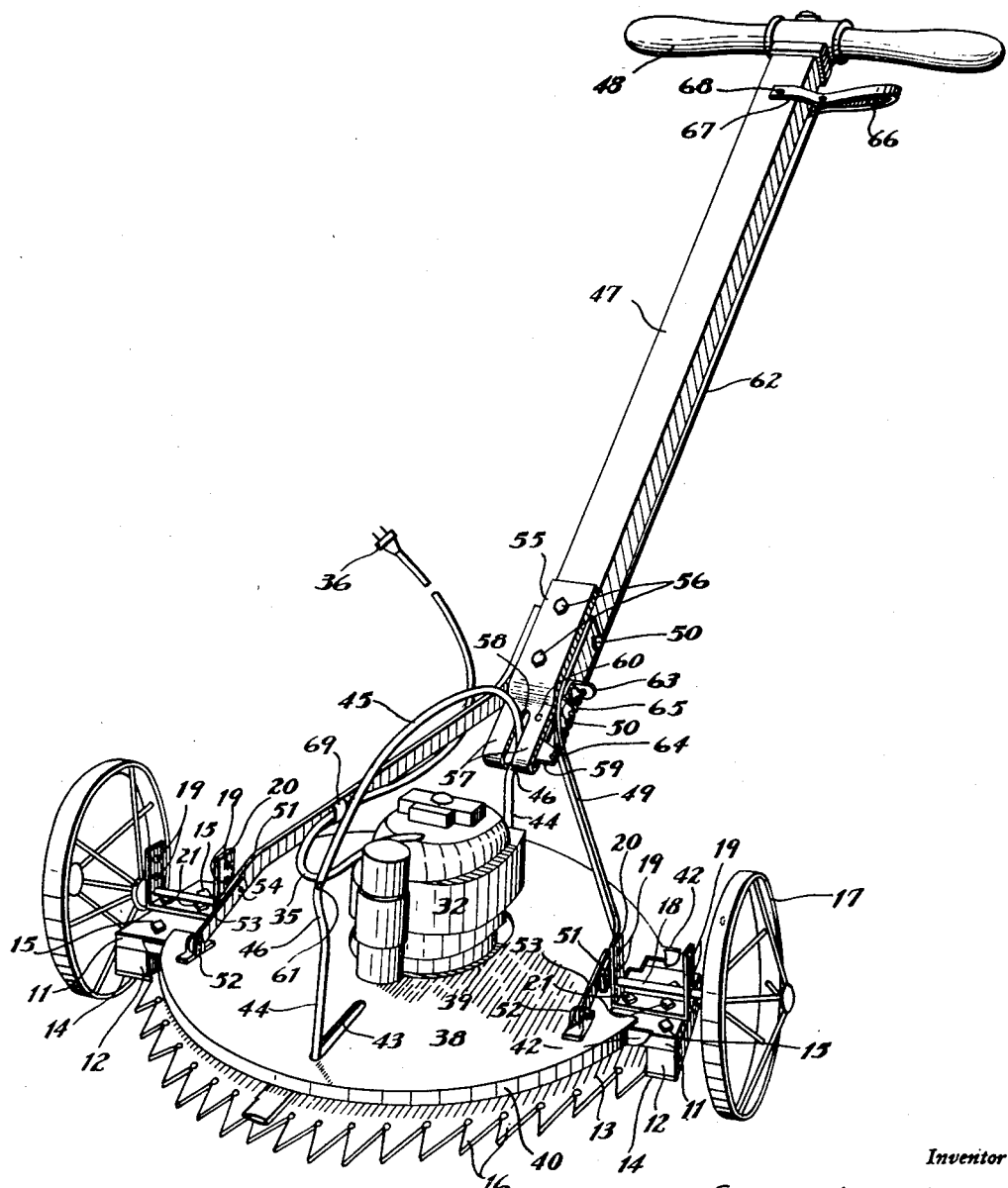
Figure 1 is a perspective view of a rotary grass cutter embodying the invention.

Referring to the drawings in detail, the rotary grass cutter of the present invention is shown as comprising a frame including a circular base plate 10, preferably of wood or the like to lighten the weight of the machine and require less energy to advance the same by the operator. This base plate is provided with diametrically opposite reduced side extensions 11, to the bottom of each of which is provided an extension or strip 12, below which a toothed guard plate 13, also of circular form in plan, is securely bolted, by similar diametrically opposite reduced extensions 14 on said guard plate at the sides, as indicated at 15. This guard plate 13 is provided with a series of sharpened tapered guard teeth 16 at the front and back which prevent the entrance of large sticks or stones which might interfere with the operation of the cutter if they should pass into the notches between the teeth. The machine is supported on transporting or ground wheels 17, adapted to rotate on stub axles 18 secured in any one of a pair of a series of spaced vertical holes 19 provided in the vertical legs of U-shaped brackets 20, one of which is bolted to each of the extensions 11 of the base plate 10 diametrically opposite each other and in alignment, as shown at 21. The frame is thus pivotally suspended from the wheel axles and in order to prevent the same from tilting excessively, either at the front or back, limiting or stop means is provided on the toothed guard plate, which may be in the form of longitudinally aligned U-shaped knobs or bolts 22 at the front and back of the guard plates inwardly of the teeth so as to engage and ride on the ground with a minimum of friction and without interfering with the advance of the machine. Since these bolts extend downwardly from the bottom of the toothed guard plate, they prevent the machine from tilting excessively.

Positioned to operate horizontally above the toothed guard plate but out of contact therewith so as to void a shearing action with the teeth, which thus need not be sharpened as in the case of a reciprocating sickle and its guard fingers, is a rotary cutter 23 more particularly shown in Figure 3 of the drawings. This cutter comprises a circular central portion 24 flanged around its edge as indicated at 25 and having a series, preferably four, equally spaced similarly flanged arms 26 extending radially therefrom ninety degrees apart, although the number may be varied if desired. These flanged arms form channels within which rectilinear cutter blades 27 may be seated, the arms and blades being correspondingly apertured as indicated at 28 at spaced points, so that the cutter blades may be bolted to the arms. The outer or free ends of the cutter blades project from the free ends of the arms and these ends are, by reason of the blades being of high quality tool steel, hardened and ground, efficient cutting means, and provided with stepped cutting edges 29 adapted when the cutter blades are driven at high speed, to revolve and cut the grass or other vegetation by impact therewith in a whirling or sweeping action horizontally as the machine is advanced. The height of the cutter from the ground may be regulated by adjusting the axles in any one of the series or sets of holes in the arms of the U-shaped bracket 20, so as to raise or lower the cutters as desired. In this way, the height of the cut of the grass or other vegetation, may be effectively regulated. The rotary cutter is provided with a central sleeve 30 by which it is secured to the lower end of the shaft 31 of a vertical type of motor 32 shown as an electric motor, which is bolted upon the plywood or other base plate 10 and extends down through a central opening 33 therein, as by means of a set screw 34. It should be noted that the outside perimeter of the guard plate 13 extends beyond the working arc of the cutter blades, preferably about one-half inch, so as to prevent the cutter blades from doing damage or coming in contact with the feet of the operator, while the V-shaped notches of the teeth 16 permit the grass to come into contact with the whirling blades but prevent the entrance of large sticks or stones or contact thereof with the blades and damaging the same. At the same time, the cutter will operate sufficiently close to surrounding fences, if any, and right up to walls of a house or close to the trees, bushes or hedges, to obviate the necessity of employing a scythe, a sickle or shears for trimming purposes around such objects, as is necessary with the conventional lawn mowers. The central disk portion 24 and its arms 26 form a holder for the blades 27 and may be of cast or pressed metal to give sufficient weight to operate as a flywheel. The motor 32 has the shaft 31 extending from the rotor thereof downwardly for connection with the cutter as described, and is shown provided with an extension cord 35 having a terminal plug 36 by which it may be plugged into the socket of the house wiring for obtaining the necessary current to operate the motor, although the motor may be of any other suitable type within the purview of the invention. In practice, a one-fourth horse power motor of the vertical type so that the cutter operates horizontally in its rotation on a vertical axis at a speed of 1760 R. P. M. or otherwise has been found practical, operating on an ordinary house current of 110 volts, but it is not desired to limit the invention thereto. Also, by reason of the direct connection of the rotor shaft of the motor with the cutter to cause rotation thereof at high speed, the necessity of employing complicated bearings, gears and the like, is entirely avoided. This eliminates much friction and manual power required to advance the machine.

Fitting over the base plate 10 of the frame, which forms a platform upon which the motor is mounted and bolted as indicated at 37 is a relatively light weight sheet metal guard 38 also relatively circular in plan but of larger diameter than the base plate. This guard has a centrally elongated opening 39 permitting it to be shifted back and forth around the motor and a depending peripheral flange 40 extending down in close proximity to the toothed guard plate 13 and the cutter blades to protect the feet of the operator and prevent them from coming in contact with the teeth of the guard plate as well as the cutting blades as they revolve over the plate and beneath the guard plate 38 as more particularly shown in Figure 2 of the drawings. This guard is provided with recesses 41 at the opposite sides to accommodate the brackets 20 and permit movement of the guard relative thereto at the front and back, the cut-outs being sufficiently wide at the recesses to permit this relative to the bight portions of the brackets 20, while wings 42 are provided at the sides of the recesses contiguous with the flange 40 and extending therefrom along the sides of the extensions 11 but spaced therefrom to allow similar movements. The guard 38 is also provided with diametrically opposite aligned slots 43 to permit movement of the guard relative to the legs 44 of a guide yoke 45, the legs of which are anchored at their extremities in suitable holes provided in the base plate 10, so as to extend longitudinally fore and aft. The guide yoke 45 is provided with a concentrically arcuate top portion which adjoins outwardly extending angular portions 46 at the upper ends of the legs extending at obtuse angles to the vertical legs proper at the front and back of the machine and base plate. The purpose of this guide yoke will be subsequently explained.

A handle 47 having a cross gripping bar or handle proper 48, is provided for the machine, and is pivotally connected to the axles 18 of the ground wheels by means of a handle yoke consisting of downwardly diverging strips 49 which are bolted as at 50 through the sides of the handle bar 47 at their upper ends which are parallel to each other for portions of their lengths and spaced apart in relatively close proximity at the convergent ends of the bars. The lower ends 51 are also extended angularly in parallel relation at obtuse angles relative to the main portions of the strips 49 where they pivotally connect to the axles 18, the inner ends of which may be provided with suitable means such as cotter pins or keys for retaining the connection.

In order to shift the guard 38 so that it extends backwardly beyond the teeth of the guard plate 13 and the cutter blades 27 in a direction in which the handle 47 extends from the frame of the machine, as particularly shown in Figure 2 of the drawings, and so that when the handle 47 is swung to the opposite end to advance the machine in the opposite direction, the guard will be shifted to the opposite end which then becomes the back of the machine, as indicated in dotted lines in Figure 2, the same is operated by the swinging of the handle. For this purpose, connections are made between the yoke and the movable guard which slides back and forth as described. This connection may consist of U-shaped brackets 52 which are fastened on top of the guard 38 adjacent the recesses or cut-outs 41, one at each side, the apertured spaced pivot ears of the brackets being pivotally connected by links 53 with the handle yoke inwardly of the pivotal point thereof to the axles 18 as indicated at 54 so that when the handle is swung in one direction, the guard will be moved in the same direction therewith and when swung in the opposite direction, will be swung in the opposite direction therewith, to prevent the feet of the operator from coming in contact with the teeth of the guard plate 13, and the cutting edges 29 of the cutter blades 27. In this movement, the handle is adapted to be guided by the guide yoke 45 at its upper arcuate portion which is concentric with the pivot of the handle and its yoke, and for this purpose, a guide 55 is connected to the lower end of the handle bar 47 and consists of a substantially U-shaped member in the form of rebent strip bolted to the handle as indicated at 56, through the top and bottom. The bight portion has the sides offset toward each other so as to be closely related and still provide a narrow slot therebetween as indicated at 57, at which point the strip is slotted as at 58 to provide a fork designed to straddle the guide yoke 45. An L-shaped latch member 59 is pivoted at 60 in one slotted tine of the fork of the guide member 55 and is adapted to engage a notch 61 in the side of the guide yoke 45 at or near the end of the arcuate portion thereof so as to hold the handle at the back of the machine at the proper inclination, in whichever direction it is shifted or swung. Of course, any number of notches may be provided, in order to regulate the height of the handle to suit the particular elevation thereof required by the operator in pushing the machine across the lawn. In order to hold the latch normally engaged, and to release the same when desired from the hand grip bar in convenient reach of the operator without bending over, the latch is normally engaged with a notch but is adapted to be disengaged therefrom when desired. For this purpose, a connecting rod 62 is slidably mounted through an angular bracket 63 bolted to one side of the handle or by means of one of the bolts which secure the yoke 49 to the handle 47. This rod has its lower end bent to engage a hole 64 in the outwardly extending arm of the latch 59 and between the adjacent edge of the arm and the bracket 63, an expansible coil spring 65 is mounted on the rod 62 to normally press the latch in position into the notch 61. The rod 62 extends along one side of the handle 47, and at its upper end, is connected to a latch lever 66 between its ends, this latch lever being formed of a strip rebent on itself to form an outer handle portion and an inner fork 67 which is pivoted to the handle through the top and bottom as indicated at 68 in convenient reach of the hand of the operator gripping one end of the handle bar 48. Thus, by releasing the latch, the handle will be released from its locked position in engagement with the guide yoke 45, and it may be swung over in a longitudinal direction to what was previously the front of the machine, and which then becomes the back of the machine. At the same time, the yoke 49 will cause the links 53 to shift the guard 38 in the opposite direction, to expose the front teeth of the guard plate 13, and cover the teeth at the rear thereof, from the full line position shown in Figure 2 to the dotted line position shown therein, so that no matter in which direction the machine is advanced, in being moved back and forth over a lawn, the feet of the operator will be prevented from coming in contact with the sharp pointed ends of the teeth 16 of the guard plate 13 and the cutting ends of the cutter blades 27. However, the handle will be held in either position by the latch as described automatically under the urgence of the spring 65. The relative position of the flange of the guard 38 and its flange 40 to the teeth of the guard plate 13, is clearly shown in Figure 4 of the drawings. While the teeth 16 will permit the grass to come into contact with the cutting edges 29 of the revolving blades 27, to efficiently cut the same by impact while rotating at high speed, there is a clearance between the blades 27 and the guard plate 13 so that there is no shearing action. Also, the guard permits the cutters to closely approach trees and other objects without actually touching the same and in this way, serves a clear advantage over the conventional lawn mower and eliminates the necessity of using a scythe, sickle, shears or other trimming devices which is usually so bothersome and arduous. It should also be noted, that the extension cord 45 may be clipped to one side of the yoke 49, as indicated at 69, at one side of the machine, and since the machine is operated so that the cutter will always be exposed at the front, it may be moved backward and forward and the extension cord will always be on one side and away from the cutter and thus prevent fouling the cord, as would happen, were it necessary to turn the machine around. In other words, at each end of the path of cut, the handle 47 is merely swung over from the back to the front after releasing the latch as described, when it will automatically catch in the notch at the other side of the guide yoke so that the direction of advancing the machine may be reversed with the same advantages. Since the handle is connected to the guard 38 through the medium of the handle yoke, and the links as described, the guard will always be in proper relation to the direction of the operator. If desired, a switch may be located near the handle for controlling the operation of the motor, though this is entirely dependent upon the wishes of the operator. The machine provides a simple efficient means for mowing lawns at a very little expense and physical effort on the part of the operator.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

1. A rotary grass cutter including a wheeled frame, a motor mounted centrally of the frame and having a depending rotary drive shaft, a rotary cutter fixed to the lower end of the shaft beneath the frame and having a plurality of radial cutter blades, a guard plate suspended from the frame outwardly of the rotary cutter, said guard plate having teeth at diametrically opposite edges thereof outwardly of the ends of the cutter blades, a movable guard mounted on the frame and adapted to be projected to cover the teeth at one of said edges and to expose the teeth at the other of said edges, and a handle swingably mounted on the frame and connected to the guard to shift the guard when the handle is swung from a side of the frame adjacent one of said edges to a side adjacent the other of said edges.

2. A rotary grass cutter comprising a wheeled frame including a base plate having side extensions, a suitably driven motor mounted centrally on the base plate and having a depending drive shaft, a rotary cutter fixed to the drive shaft beneath the base plate and having a plurality of radial cutter blades with cutting edges on one side, adapted to rotate in a horizontal path beneath the base plate with the cutting edges projecting from the periphery thereof, a toothed guard plate fastened to the base plate and positioned below the cutter blades with teeth at diametrically opposite sides thereof and its perimeter projecting beyond the ends of the cutter blades, a guard on the base plate and slidable to project at the front or rear thereof, a handle having a yoke pivoted on the frame and having connection with the guard to shift the latter upon being swung over the frame from a side thereof adjacent to one of said diametrically opposite edges to the opposite side whereby the guard will cover the guard plate and cutters to prevent the feet of the operator coming in contact therewith, and means to lock the handle in either position.

3. A rotary grass cutter comprising a wheeled frame including a base plate having side extensions, a suitably driven motor mounted centrally on the base plate and having a depending drive shaft, a rotary cutter fixed to the drive shaft beneath the base plate and having a plurality of radial cutter blades with cutting edges on one side, adapted to rotate in a horizontal path beneath the base plate with the cutting edges projecting from the periphery thereof, a toothed guard plate fastened to the base plate and positioned below and in spaced relation to the cutter blades with teeth at the front and back thereof and its perimeter projecting beyond the ends of the cutter blades, a guard on the base plate and slidable to project at the front or rear thereof, said wheeled frame being adjustable to vary the distance of the cutter vertically from the ground and the height of the cut grass, a handle having a yoke pivoted to the frame at diametrically opposite sides, links connecting the yoke inwardly of its pivot with the frame to the guard for shifting the latter upon the handle being pivotally shifted, a guide yoke on the base plate of the frame relative to which the guard is slidable, a fork member on the handle engaging and guiding the handle over the yoke, and a latch on the handle adapted to engage notches in the yoke and releasable from the end of the handle to hold the handle at an inclination when swung in either direction, so that the machine may be advanced in either direction.

GEORGE A. GENTRY.

REFERENCES CITED

The following references are of record in the file of this patent:

UNITED STATES PATENTS

| Number | Name | Date |
| --- | --- | --- |
| Re. 21,274 | Orr | Nov. 21, 1939 |
| Re. 21,289 | Orr | Dec. 5, 1939 |
| 876,637 | Hare et al. | Jan. 14, 1908 |
| 1,940,216 | Jacobson | Dec. 19, 1933 |